(12) United States Patent
Minami et al.

(10) Patent No.: US 7,698,520 B2
(45) Date of Patent: Apr. 13, 2010

(54) METHOD FOR PROCESSING BACKUP, DEVICES FOR BACKUP PROCESSING, AND STORAGE MEDIUMS FOR STORING A PROGRAM FOR OPERATING A BACKUP PROCESSING DEVICE

(75) Inventors: Eiji Minami, Shiojiri (JP); Harutoshi Wada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 11/717,396

(22) Filed: Mar. 12, 2007

(65) Prior Publication Data
US 2007/0214330 A1    Sep. 13, 2007

(30) Foreign Application Priority Data

Mar. 10, 2006  (JP) ............................. 2006-065231
Jan. 15, 2007  (JP) ............................. 2007-006259

(51) Int. Cl.
*G06F 12/16* (2006.01)

(52) U.S. Cl. ................ 711/162; 711/171; 711/172; 711/173; 711/E12.103; 713/320

(58) Field of Classification Search ................ 711/162
See application file for complete search history.

(56) References Cited

U.S. PATENT DOCUMENTS

| | | | |
|---|---|---|---|
| 5,485,606 A * | 1/1996 | Midgdey et al. ............... 707/10 |
| 6,003,044 A * | 12/1999 | Pongracz et al. ............ 707/204 |
| 6,098,175 A * | 8/2000 | Lee ............................. 713/320 |
| 6,542,975 B1 * | 4/2003 | Evers et al. .................. 711/162 |
| 6,772,302 B1 * | 8/2004 | Thompson .................. 711/162 |
| 7,024,529 B2 | 4/2006 | Yamada et al. |
| 7,149,728 B1 * | 12/2006 | Feinberg et al. ................. 707/1 |
| 7,162,597 B2 | 1/2007 | Nishimura et al. |
| 7,330,997 B1 * | 2/2008 | Odom ........................... 714/6 |
| 7,353,352 B2 | 4/2008 | Nishimura et al. |

(Continued)

FOREIGN PATENT DOCUMENTS

JP            09-305974          11/1997

(Continued)

OTHER PUBLICATIONS

Platt, John C.; Mary Czerwinski; and Brent A. Field. "PhotoTOC: Automatic Clustering for Browsing Personal Photographs." Feb. 2002. Microsoft. MSR-TR-2002-17.*

(Continued)

*Primary Examiner*—Reginald G Bragdon
*Assistant Examiner*—Nathan Sadler
(74) *Attorney, Agent, or Firm*—Nutter McClennen & Fish LLP; John J. Penny, Jr.

(57) ABSTRACT

A method for processing backup in the invention calculates a necessary capacity of a second storage medium when backing up in a plurality of divided sessions backup target data stored on a first storage medium, decides the number of dividing into the sessions based on the calculated necessary capacity and an available capacity of the second storage medium, and copies the backup target data from the first storage medium to the second storage medium, the backup target data being divided according to the number of dividing into the sessions.

14 Claims, 14 Drawing Sheets

U.S. PATENT DOCUMENTS

| | | | |
|---|---|---|---|
| 7,441,085 B2 * | 10/2008 | Chen | 711/118 |
| 2003/0046503 A1 * | 3/2003 | Park | 711/162 |
| 2003/0061456 A1 * | 3/2003 | Ofek et al. | 711/162 |
| 2004/0186969 A1 * | 9/2004 | Bress et al. | 711/162 |
| 2004/0250162 A1 * | 12/2004 | Halley et al. | 714/13 |
| 2005/0004979 A1 * | 1/2005 | Berkowitz et al. | 709/203 |
| 2005/0081008 A1 * | 4/2005 | Gold et al. | 711/162 |
| 2005/0172093 A1 * | 8/2005 | Jain | 711/162 |
| 2005/0210323 A1 * | 9/2005 | Batchelor et al. | 714/14 |
| 2005/0278299 A1 | 12/2005 | Yamada et al. | |
| 2006/0218363 A1 * | 9/2006 | Palapudi | 711/162 |
| 2008/0301132 A1 | 12/2008 | Yamada et al. | |

FOREIGN PATENT DOCUMENTS

| | | |
|---|---|---|
| JP | 2003316635 A | 11/2003 |
| JP | 2004005222 A | 1/2004 |
| JP | 2004178031 A | 6/2004 |

OTHER PUBLICATIONS

"tar.info." Dec. 18, 2004. GNU. Version 1.15.*

* cited by examiner root directory entry 310

DCIM directory entry 311

MISC directory entry 312

"100ABCDE" directory entry 321

METHOD FOR PROCESSING BACKUP, DEVICES FOR BACKUP PROCESSING, AND STORAGE MEDIUMS FOR STORING A PROGRAM FOR OPERATING A BACKUP PROCESSING DEVICE

CROSS-REFERENCE TO RELATED APPLICATIONS

The present application claims priority upon Japanese Patent Application No. 2006-65231 filed on Mar. 10, 2006, and Japanese Patent Application No. 2007-6259 filed on Jan. 15, 2007, which are herein incorporated by reference.

BACKGROUND

1. Technical Field

The present invention relates to methods for processing backup, backup processing devices, and storage media storing a program.

2. Related Art

Image data taken by an electronic still camera (a so-called digital camera), a digital video camera, etc. is initially stored on a semiconductor memory, etc. that is accommodated by the cameras. A user backs up the image data onto another recording medium such as a CD or a DVD before deleting the image data stored on this semiconductor memory, and uses this semiconductor memory repeatedly.

Accordingly, due to proliferation of electronic still cameras and digital video cameras, the opportunity that general users back up large-capacity data is increasing rapidly.

For example, if data is backed up onto a CD, etc. and its original data is deleted from a storage medium on which the original data is stored, when the backup process is not completed successfully due to the occurrence of errors during the backup process, all data written onto the CD is lost.

Accordingly, JP-A-9-305974 discloses a system which is for automatically continuing a backup process to ensure the logical consistency of data under such a circumstance.

In recent years, portable terminal devices that can be battery-powered and can process backup are in actual use. Use of these terminal devices increases the probability of errors caused by battery power outage during a backup process, impacts from the outside, and the like. In such a case, it is impossible to continue a backup process as disclosed in JP-A-9-305974.

SUMMARY

An advantage of some aspects of the invention is to make it sure to maintain already-backed-up data even when a backup process fails and cannot continue.

Another advantage of some aspects of the invention is to enable to read a part of data when a backup process is completed successfully or even when a recording medium physically breaks thereafter due to defects such as scratches, contaminations.

A primary aspect of the invention for achieving the preceding advantages is a method for processing backup, including:

calculating a necessary capacity of a second storage medium when backing up in a plurality of divided sessions backup target data stored on a first storage medium;

deciding the number of dividing into the sessions based on the calculated necessary capacity and an available capacity of the second storage medium; and copying the backup target data from the first storage medium to the second storage medium, the backup target data being divided according to the number of dividing into the sessions.

Other features of the invention will be made clear through the following description with reference to the accompanying drawings.

DESCRIPTION OF EXEMPLARY EMBODIMENTS

Figure 1:
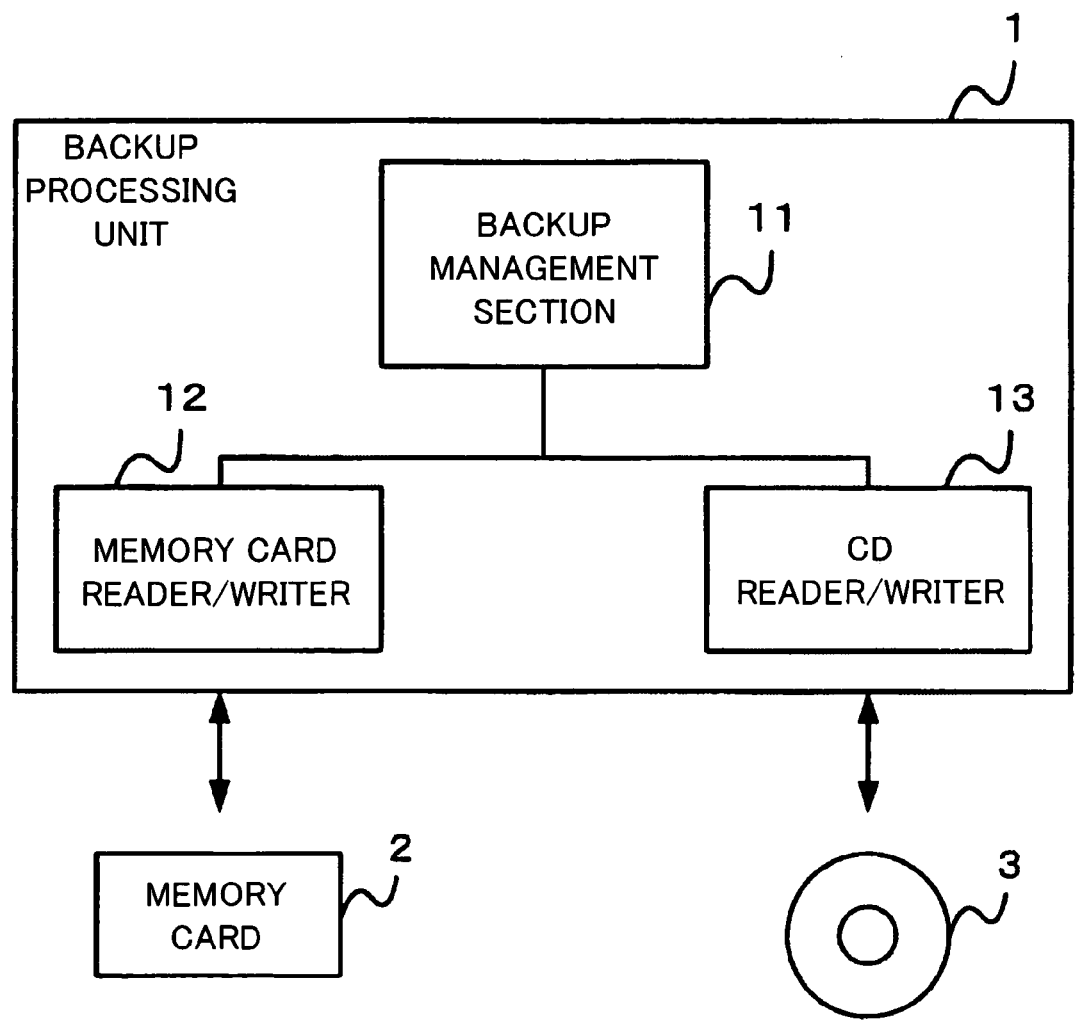
FIG. 1 is a block diagram of a backup processing device 1 according to one embodiment of the invention.

At least the following matters will be made clear by the description in the present specification and the accompanying drawings.

A method for processing backup, including:

calculating a necessary capacity of a second storage medium when backing up in a plurality of divided sessions backup target data stored on a first storage medium;

deciding the number of dividing into the sessions based on the calculated necessary capacity and an available capacity of the second storage medium; and copying the backup target data from the first storage medium to the second storage medium, the backup target data being divided according to the number of dividing into the sessions.

This enables to make sure to maintain already-backed-up data even when a backup process fails and cannot continue.

In this method for processing backup, it is desirable that the second storage medium is controlled by a battery-powered apparatus and that remaining battery level of the battery-powered apparatus is monitored. Also, it is desirable that, when it is determined that the remaining battery level is sufficient to back up the backup target data onto the second storage medium, the number of dividing into the sessions is decided to be zero. Also, it is desirable that, when it is determined that the remaining battery level is not sufficient to successfully copy backup target data corresponding to one session, the backup target data corresponding to the one session is not copied. Also, it is desirable that, after backup target data corresponding to a certain session has been successfully copied, before copying of backup target data corresponding to another session is started, whether or not the remaining battery level is sufficient to successfully copy the backup target data corresponding to the other session is determined.

Also, it is desirable that information relating to a session of the backup target data that has been successfully copied is stored, and the information is updated every time the backup target data has been successfully copied on a session-by-session basis. Also, it is desirable that, before the backup target data is copied to the second storage medium, an attribute of the backup target data stored on the first storage medium is changed to Read-only, and that, after the backup target data has been successfully copied to the second storage medium, the attribute of the backup target data stored on the first storage medium is changed to an attribute that is deletable on a session-by-session basis.

This enables to make sure to maintain already-backed-up data even when a backup process fails and cannot continue.

In this method for processing backup, it is desirable that the number of dividing into the sessions is decided for dividing the backup target data into the sessions using a sub-directory on a first level, which is located on a root directory, as a unit of dividing.

Also, in this method for processing backup, it is desirable that the number of dividing into the sessions is decided for further dividing into the sessions using a sub-directory on or below a second level, which is below the sub-directory on the first level, as a unit of dividing.

Also, in this method for processing backup, it is desirable that, when a plurality of files are included in a same directory, the number of dividing into the sessions is decided for further dividing into the sessions according to a creation date of each of the files.

Also, in this method for processing backup, it is desirable that, when a plurality of image files taken by a digital camera are included in a same directory, the number of dividing into the sessions is decided for further dividing into the sessions according to accompanying information that relates to a picture-taking condition, which is included in each of the image files.

Also, in this method for processing backup, it is desirable that the second storage medium is according to a CD-ROM file system.

A backup processing device for backing up backup target data stored on a first storage medium onto a second storage medium, including:
 a dividing section that calculates a necessary capacity of the second storage medium when backing up the backup target data in a plurality of divided sessions, and that decides the number of dividing into the sessions based on the calculated necessary capacity and an available capacity of the second storage medium; and
 a copying section that copies the backup target data from the first storage medium to the second storage medium, the backup target data being divided according to the number of dividing into the sessions.

This enables to make sure to maintain already-backed-up data even when a backup process fails and cannot continue.

A storage medium storing a program for operating a backup processing device, the program including:
 a code for calculating a necessary capacity of a second storage medium when backing up in a plurality of divided sessions backup target data stored on a first storage medium;
 a code for deciding the number of dividing into the sessions based on the calculated necessary capacity and an available capacity of the second storage medium; and
 a code for copying the backup target data from the first storage medium to the second storage medium, the backup target data being divided according to the number of dividing into the sessions.

This enables to make sure to maintain already-backed-up data even when a backup process fails and cannot continue.

First Embodiment

The section below describes a backup processing device according to one embodiment of the invention with reference to the drawings.

FIG. 1 is a block diagram of a backup processing device 1 according to the present embodiment.

More specifically, the backup processing device 1 performs data backup by copying backup target data stored on a first storage medium onto a second storage medium. Though, in this embodiment, an example is described in which data stored on a memory card 2 is backed up on a CD, the first and second storage media can be replaced by any other medium than those mentioned above.

Besides, the backup processing device 1 is structured, for example, by a general purpose computer system, and each component and function of the backup processing device 1 to be described below is achieved, for example, by performing a computer program.

Further, the backup processing device 1 can be achieved as this device alone. And also the backup processing device 1 can be realized as one function of other equipment such as a printer, a digital multifunction machine, or a viewer by integrating the device into the equipment, or can be realized by combination with an electronic still camera, a digital video camera, etc. using a part of functions of these cameras.

The backup processing device 1 shown in FIG. 1 includes a backup management section 11, a memory card reader/writer 12, and a CD reader/writer 13.

The memory card reader/writer 12 reads data stored on the memory card 2, and writes data onto the memory card 2.

The CD reader/writer 13 reads data stored on the CD 3, and writes data onto the CD 3.

The backup management section 11 performs a process for backing up the backup target data stored on the memory card 2 onto the CD 3. For example, if a capacity of backup target data is large and the backup process takes time, the backup management section 11 divides the data according to a predetermined rule. Thus, the divided data is each defined as a unit, and the backup process is performed in a plurality of sessions. Dividing of the backup target data will be described later.

Figure 2:
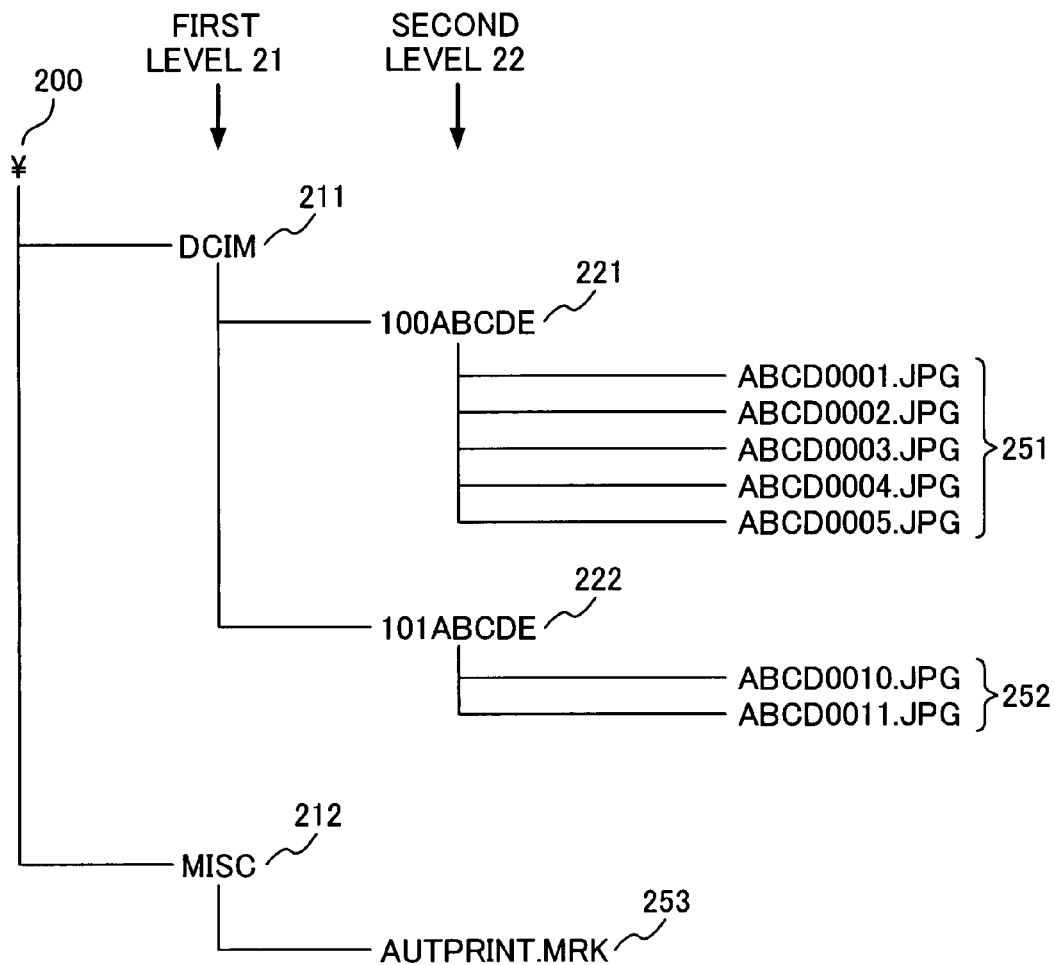
FIG. 2 shows an example of a directory structure stored on the memory card 2.

FIG. 2 shows an example of a directory structure stored on the memory card 2.

As shown in the figure, the memory card 2 includes the following sub-directories in a first level 21 immediately below a root directory 200: a "DCIM" directory 211 and a "MISC" directory 212. A second level 22 below the "DCIM" directory 211 further includes the following sub-directories: a "100ABCDE" directory 221 and a "101ABCDE" directory 222. The "100ABCDE" directory 221 includes five image files 251, and the "101ABCDE" directory 222 includes two image files 252. The "MISC" directory 212 includes one text file ("AUTPRINT.MRK") 253.

The section below describes a data structure of the CD 3 when data included in the directory structure shown in FIG. 2 is backed up onto the CD 3 as backup target data.

Figure 3:
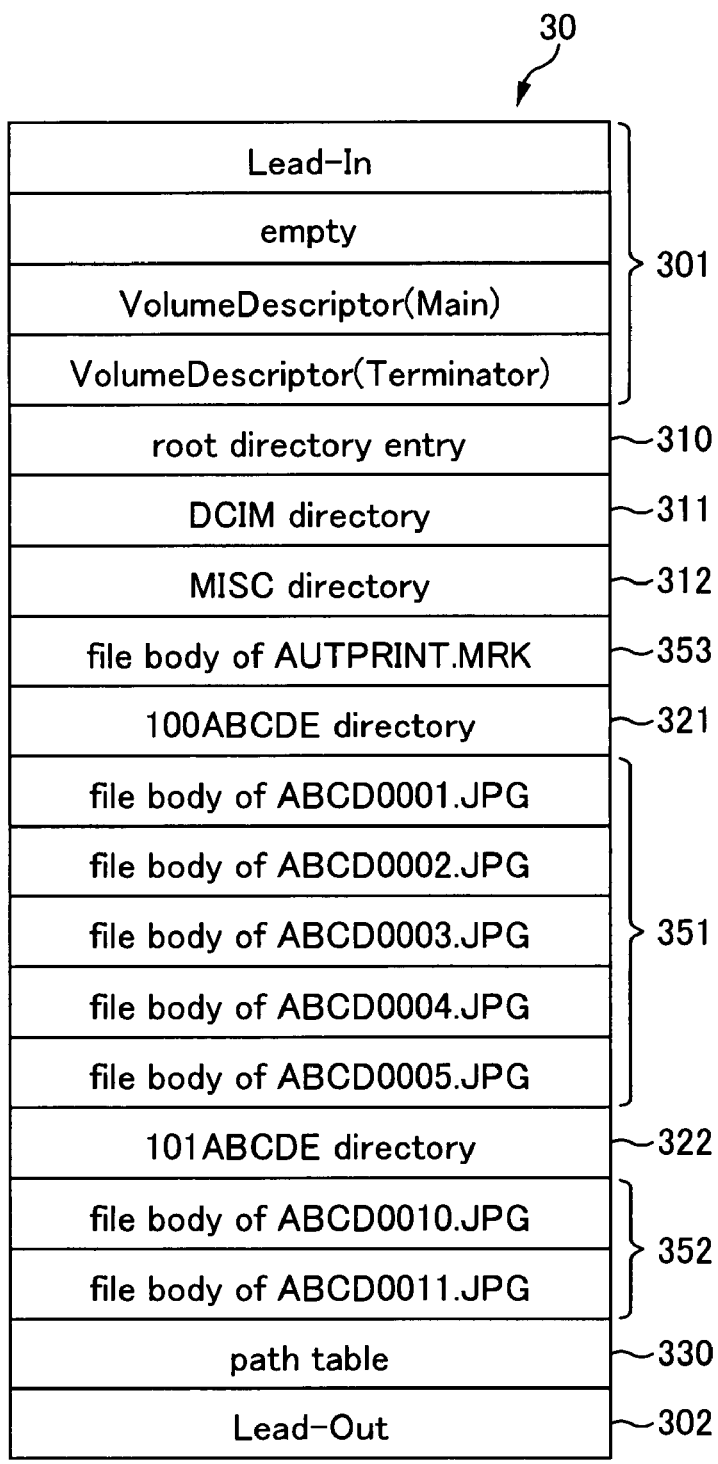
FIG. 3 shows a data structure when data is backed up onto a CD 3 in a single session.

FIG. 3 shows a data structure of backup data 30 when the backup target data shown in FIG. 2 is backed up onto the CD 3 in a single session.

The CD 3 has a structure according to the CD-ROM file system. Accordingly, management areas 301, 302 according to the CD-ROM file system are provided at a beginning and an end of the backup data 30.

Though this embodiment describes an example of a CD conforming to ISO 9660 level 1, it is also possible to apply the invention to other standards that is an extension of ISO 9660 level 1 (for example, ISO 9660 level 2, Joliet, etc.).

Next to the management area 301 at the beginning, a root directory entry 310 and directory entries 311, 312 of the "DCIM" directory 211 and the "MISC" directory 212 which are sub-directories are included in the backup data 30.

Since the "MISC" directory 212 has no sub-directory, a data body 353 of the text file 253 is stored subsequent to the directory entry 312.

Successively, a directory entry 321 of the "100ABCDE" directory 221 in the second level 22, a data body 351 of the image file 251 in this "100ABCDE" directory 221, a directory entry 322 of the "101ABCDE" directory 222, and a data body 352 of the image file 252 in this "101ABCDE" directory 222 are stored.

Within the preceding description, all directories and data bodies of the backup target data are included. In the case of the CD-ROM file system, a path table 330 which indicates a directory structure of all data stored on the CD 3 is further provided.

The path table 330 is for representing, in a manner of the tree structure as shown in FIG. 2, all data which is contained in the CD 3 at a time of storing the backup data 30 onto the CD 3. Therefore, for example, if the backup data 30 is written onto a brand-new CD 3, the path table 330 represents the tree structure shown in FIG. 2.

FIGS. 5 through 9 show data structures of the directory entries 310, 311, 312, 321, 322 of the root directory, the "DCIM" directory, the "MISC" directory, the "100ABCDE" directory, and the "101ABCDE" directory.

The directory entries 310, 311, 312, 321, 322 include respectively pointer records 3101, 3111, 3121, 3211, 3221 that each indicates sectors of its own directory, and also include pointer records 3102, 3112, 3122, 3212, 3222 that indicate sectors of their respective parent directories. The data length of all these pointer records is fixed at 34 bytes.

Besides, each of the directory entries 310, 311, 312, 321, 322 includes sub-directory records 3103, 3113 if there is a sub-directory immediately below its own directory, and includes file records 3124, 3214, 3224 if there is a file immediately below its own directory.

The sub-directory records 3103, 3113, each include a pointer that indicates sectors storing a directory entry of the sub-directory and a name of the sub-directory. The record length is variable length and its maximum length is 46 bytes.

The file records 3124, 3214, 3224 each includes a pointer that indicates sectors storing a body of a file and a name of the file. The record length is variable length and its maximum length is 46 bytes.

Figure 5:
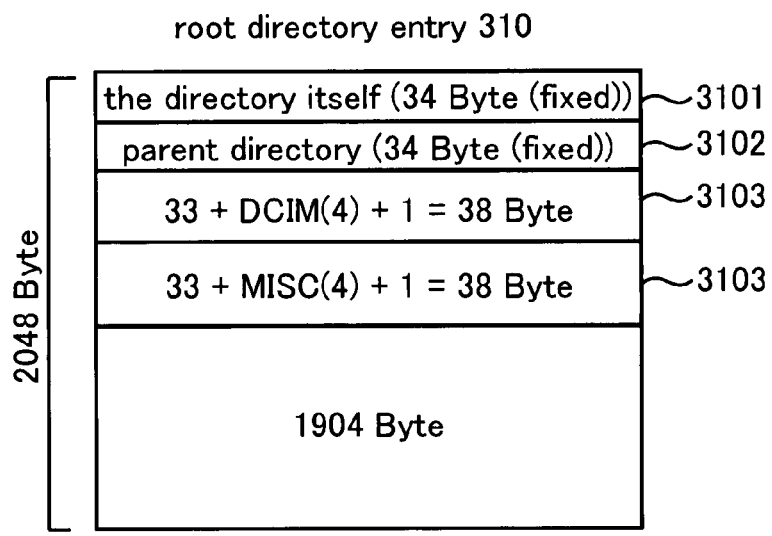
FIG. 5 shows a data structure of a root directory entry.
Figure 6:
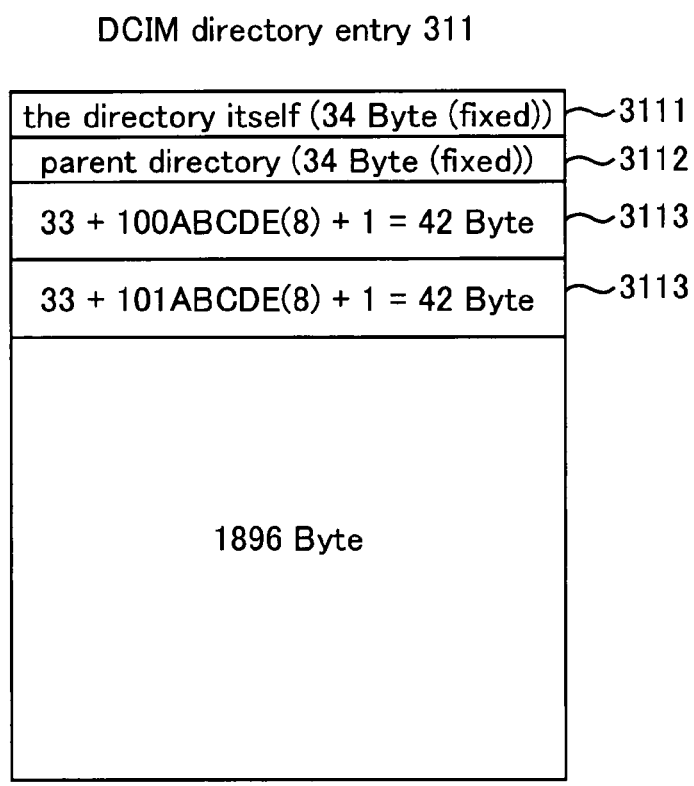
FIG. 6 shows a data structure of a "DCIM" directory entry.
Figure 7:
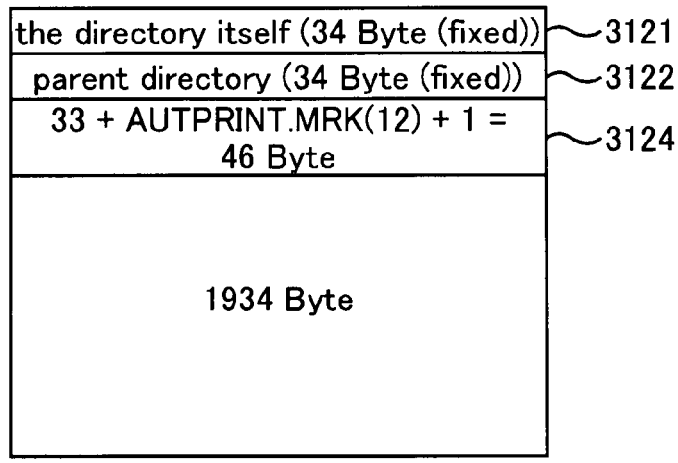
FIG. 7 shows a data structure of a "MISC" directory entry.
Figure 8:
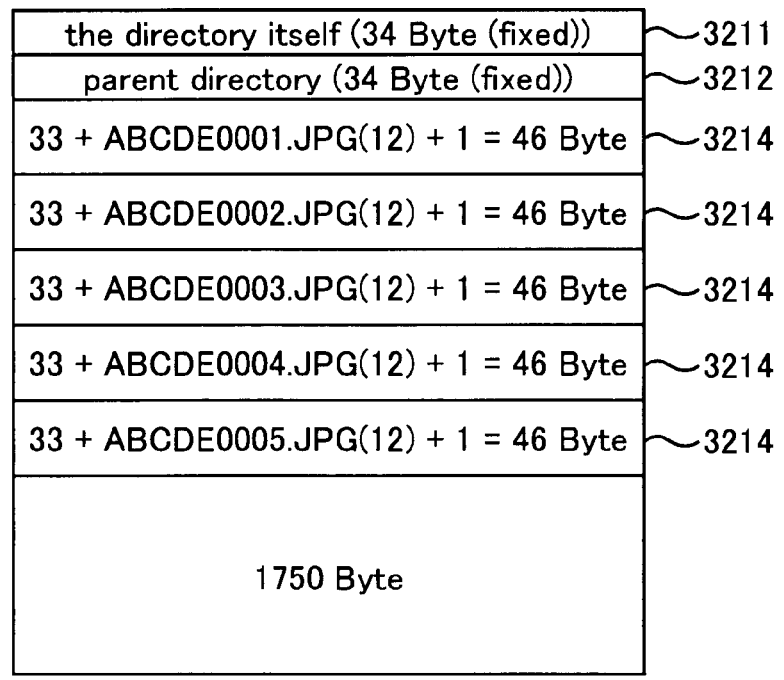
FIG. 8 shows a data structure of a "100ABCDE" directory entry.
Figure 9:
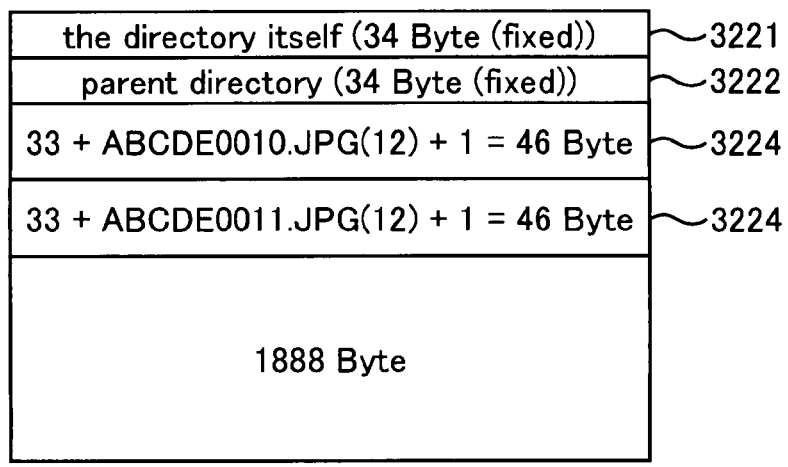
FIG. 9 shows a data structure of a "101ABCDE" directory entry.

For example, the root directory entry 310 shown in FIG. 5 includes the directory record 3103 of the "DCIM" directory 211 and the directory record 3103 of the "MISC" directory 221. The directory entry 312 of the "MISC" directory shown in FIG. 7 includes the file record 3124 of the text file 253.

Figure 10:
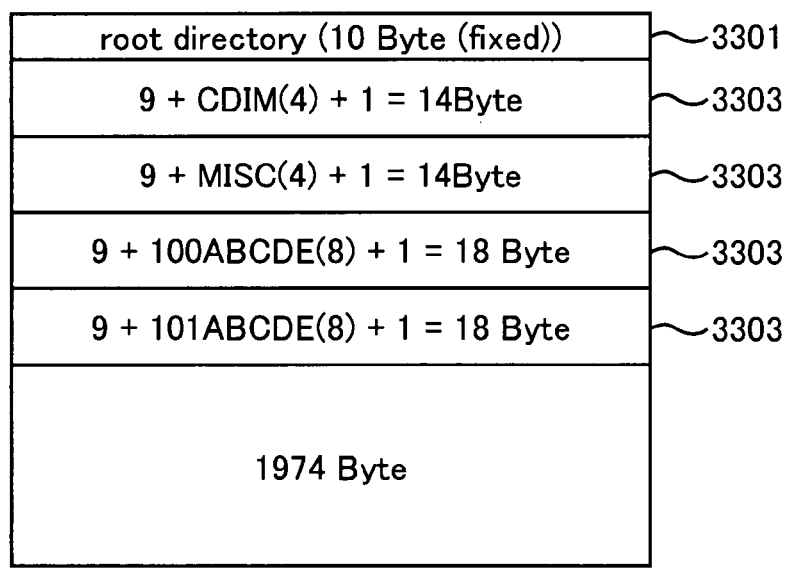
FIG. 10 shows a data structure of a path table.

FIG. 10 shows a data structure of a path table 330.

The path table 330 includes a root directory record 3301, and sub-directory records 3303 that each contain a name of the sub-directory itself and a pointer indicating a parent directory of the sub-directory itself.

The root directory record 3301 is fixed at 10 bytes. The sub-directory record 3303 is variable length, and its maximum length is 18 bytes.

Note that one sector of the CD 3 is 2048 bytes. Accordingly, even if data size to be stored on each of the directory entries 310, 311, 312, 321, 322 and the path table 330 is less than 2048 bytes, storage space is consumed in multiples of 2048 bytes in order to store one of the directory entries or the path table. Also, storing the data body is performed in the same manner as mentioned above. More specifically, when the data body is stored onto the CD 3, storage space is consumed in multiples of 2048 bytes depending on the size of the data body.

Next, FIG. 4 shows data structures of backup data 31, 32 when the backup target data shown in FIG. 2 is backed up onto the CD 3 in two divided sessions.

More specifically, this section describes the data structures of the backup data 31, 32 when the backup process is divided into the following two sessions and is performed: a first session that includes the "DCIM" directory 211 on the first level 21 and sub-directories and files that are below the "DCIM" directory 211, and a second session that includes the "MISC" directory 212 and files that are below the "MISC" directory 212.

Figure 4A:
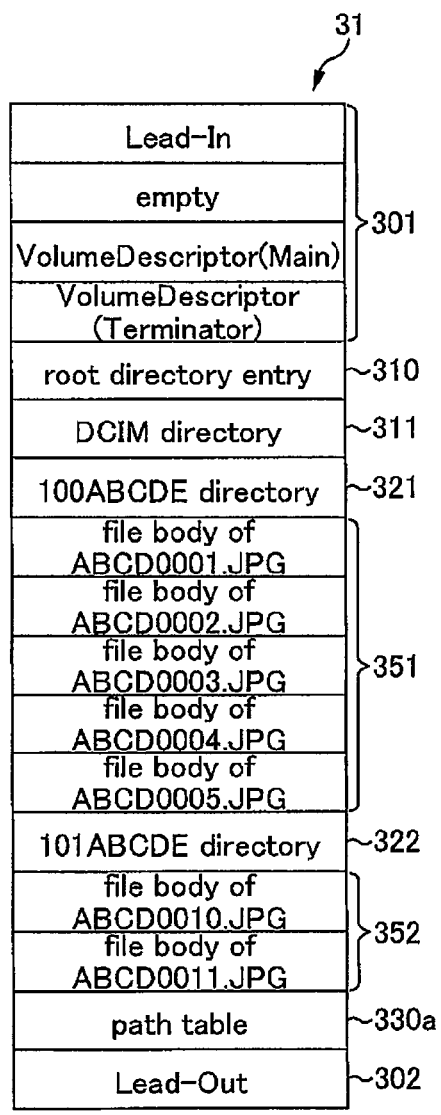
FIGS. 4A and 4B show a data structure when data is backed up onto the CD 3 in two divided sessions.

FIG. 4A shows the backup data 31 after a backup process of the first session is performed.

The backup data 31 has a structure that excludes the "MISC" directory entry 312 and the text file body 353 from the backup data 30 shown in FIG. 3. However, the path table 330a is different in content from the path table 330 of the backup data 30. More specifically, since the "MISC" directory 212 is not copied, the path table 330a includes information indicating a directory structure that excludes the "MISC" directory 212 and the text file 253 that are below the "MISC" directory 212 from the directory structure shown in FIG. 2.

Figure 4B:
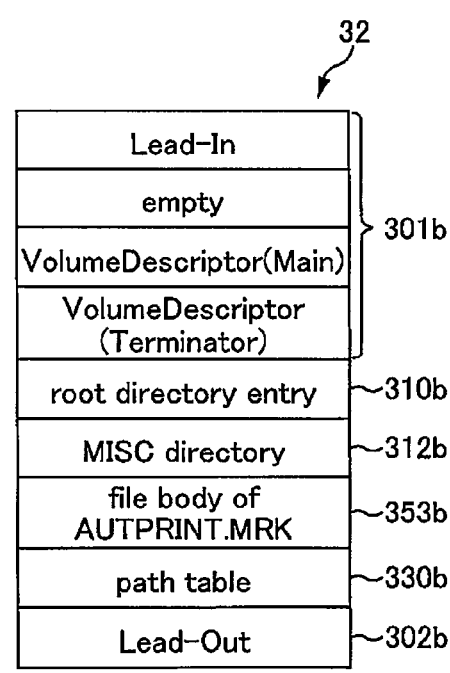

FIG. 4B shows the backup data 32 when a backup process of the second session is performed successively after the first session.

The backup data 32 includes a directory entry 312b and a text file body 353b of the "MISC" directory 212, which are to be backed up in this session. In addition thereto, management areas 301b, 302b, a root directory entry 310b, and a path table 330b are also included.

At this stage, the path table 330b includes information indicating the directory structure shown in FIG. 2. The reason thereof is that all the data shown in FIG. 2 are copied onto the CD 3 because the "DCIM" directory 211 is backed up in the first session and the "MISC" directory 212 is copied in the second session.

From this it can be seen that, even if a same data is backed up, a necessary total capacity is different as a result of dividing into sessions. More specifically, in the case of backing up in a plurality of the sessions as shown in FIG. 4, the necessary capacity is larger than in the case of backing up in a single session as shown in FIG. 3, by the capacities for the management areas 301b, 302b, the root directory entry 310b, and the path table 330b.

Figure 11:
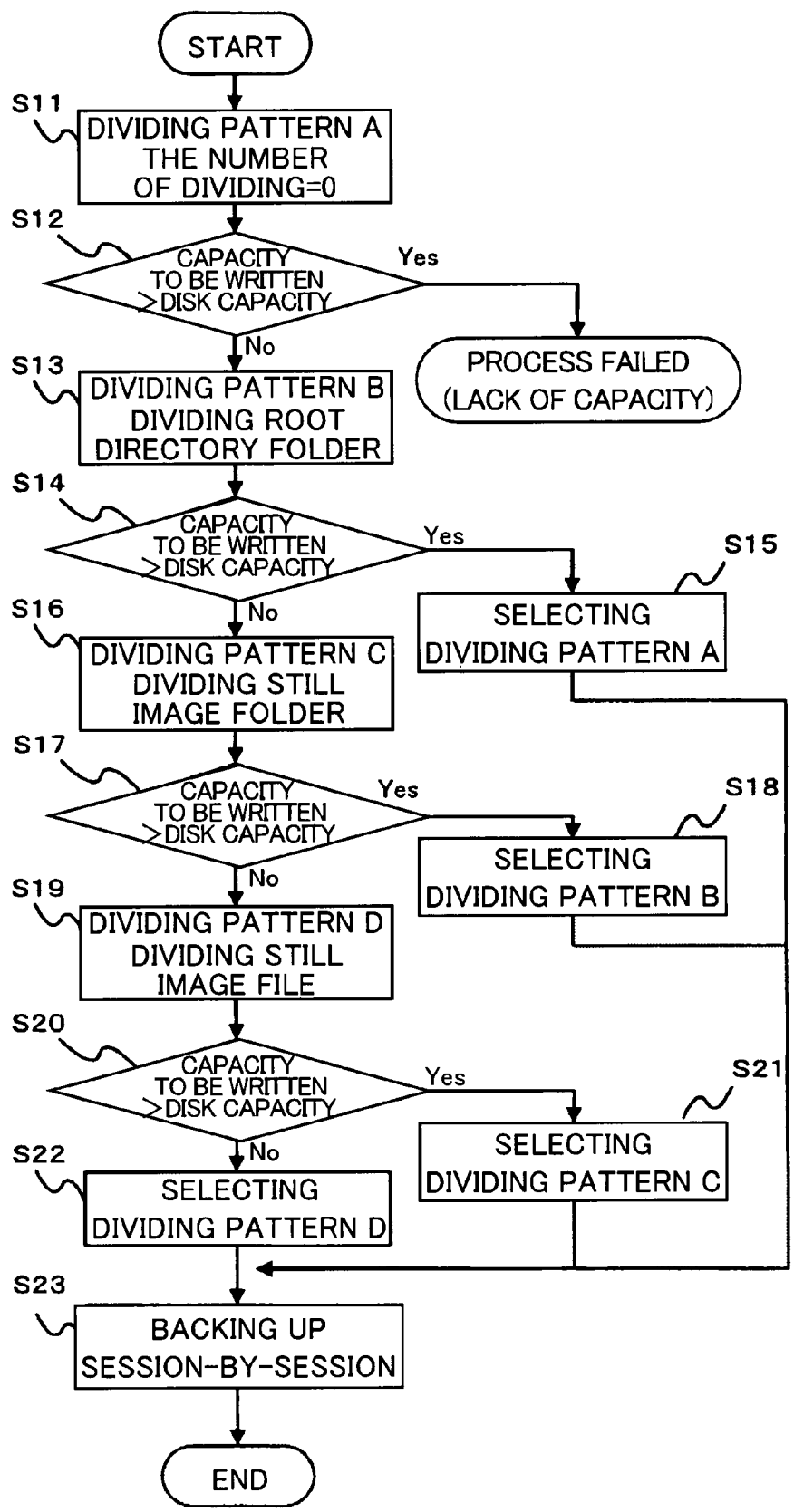
FIG. 11 is a flowchart showing procedures of a dividing backup process.

FIG. 11 is a flowchart showing procedures of a dividing backup process performed by the backup management section 11.

Figure 12:
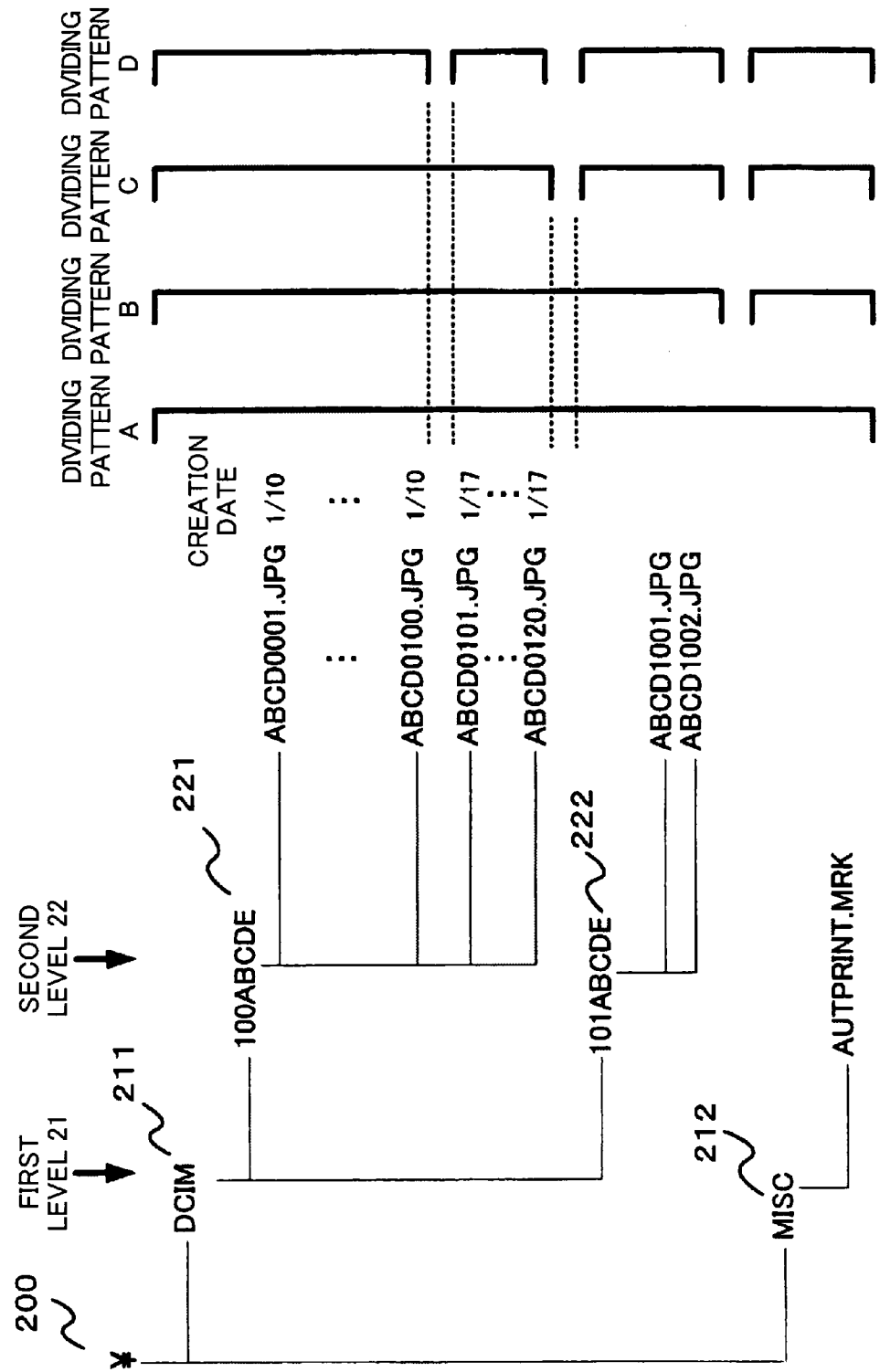
FIG. 12 shows a relationship between a directory structure and dividing patterns.

FIG. 12 shows a relationship between the directory structure and the dividing patterns.

This section describes an example of a backup process of backup target data having the directory structure shown in FIG. 12 according to the flowchart shown in FIG. 11.

First, the backup management section 11 takes a dividing pattern A and sets the number of dividing to zero (S11). In other words, the backup management section 11 considers backing up in a single session without dividing the backup target data.

At this stage, the backup management section 11 determines whether or not a total capacity of the backup target data is larger than an available capacity of the CD 3 to which the data is backed up (S12). If the total capacity of the backup target data is larger than the available capacity of the CD 3 (S12: Yes), the backup management section 11 terminates the backup process at this stage because the process cannot succeed due to lack of the capacity of the CD 3.

If the total capacity of the backup target data is not larger than the available capacity of the CD 3 (S12: No), the backup management section 11 takes a dividing pattern B and calculates a capacity of the CD 3 that is necessary when dividing the backup process into a plurality of sessions using a sub-directory on the first level as a unit of dividing (S13).

FIG. 12 shows an example of dividing in which the "DCIM" directory 211 is the first session and the "MISC" directory 212 is the second session.

As mentioned above, if a session is divided, the management area, etc. increases, so that a total capacity necessary to perform a backup process increases. Besides, there are cases in which the number of necessary sectors may be different depending on the number of directories or files, file sizes, and the like.

For example, every sub-directory needs one sector as its directory entry. Since a maximum length of a directory record is 46 bytes in each directory entry, one sector can store 44 directory records at maximum. In short, there are cases in which the number of sectors necessary for directory entries may be different depending on the number of sub-directories immediately below a directory. Otherwise, since a maximum length of a directory record in a path table is 18 bytes, one sector can store 113 directory records at maximum. In short, there are cases in which the number of sectors necessary for a path table may be different depending on the number of total directories included in one session.

Therefore, the backup management section 11 calculates the total capacity necessary for backup based on a directory structure and the number of directories that are included in each session.

Next, the backup management section 11 decides whether or not a total capacity necessary for the dividing pattern B is larger than the available capacity of the CD 3 to which the data is backed up (S14). If the total capacity necessary for the dividing pattern B is larger than the available capacity of the CD 3 (S14: Yes), the dividing pattern A is selected (S15).

If the total capacity necessary for the dividing pattern B is not larger than the available capacity of the CD 3 (S14: No), the backup management section 11 takes a dividing pattern C and calculates a capacity of the CD 3 that is necessary when dividing the backup process into a plurality of sessions using a sub-directory on the second level as a unit of dividing (S16).

In the example of FIG. 12, the "100ABCDE" directory 221 and the "101ABCDE" directory 222 are further divided into separate sessions.

The backup management section 11 determines whether or not a total capacity necessary for the dividing pattern C is larger than the available capacity of the CD 3 to which the data is backed up (S17). If the total capacity necessary for the dividing pattern C is larger than the available capacity of the CD 3 (S17: Yes), the dividing pattern B is selected (S18).

If the total capacity necessary for the dividing pattern C is not larger than the available capacity of the CD 3 (S17: No), the backup management section 11 takes a dividing pattern D. The backup management section 11 divides a plurality of files in a sub-directory located on the second level into two groups, and calculates a capacity of the CD 3 necessary therefor (S19).

At this stage, if a sub-directory located on or lower than a third level exists, it is also possible to further divide files using the sub-directory as a unit of dividing. In this example, since there is no sub-directory located on or lower than the third level, a number of files in the sub-directories on the second level, which is the bottom level, are divided into a plurality of groups.

At this stage, a plurality of files in a same directory can be divided in the following manner. For example, it is acceptable to make one group with files that have a same creation date, or to divide files that each has a serial-numbered file name at a file whose serial number becomes discontinuous, or to divide image files according to accompanying information contained therein (i.e., picture-taking information contained in Exif format files, etc.).

The backup management section 11 determines whether or not a total capacity necessary for the dividing pattern D is larger than the available capacity of the CD 3 (S20). If the total capacity necessary for the dividing pattern D is larger than the available capacity of the CD 3 (S20: Yes), the dividing pattern C is selected (S21).

If the total capacity necessary for the dividing pattern D is not larger than the available capacity of the CD 3 (S20: No), the dividing pattern D is selected (S22).

The backup management section 11 backs up the backup target data in each of the sessions according to the dividing pattern that is selected by the above-mentioned process (S23).

Therefore, there is no risk of losing all the data even if troubles occur during the backup process, and it is possible to back up more data.

Note that, in the above-mentioned procedures, if the backup target data are files that are in a single directory or in a directory below the single directory, the dividing patterns B, C can not taken and procedures relating to these patterns are skipped.

Second Embodiment

Configuration of Printer

Figure 13:
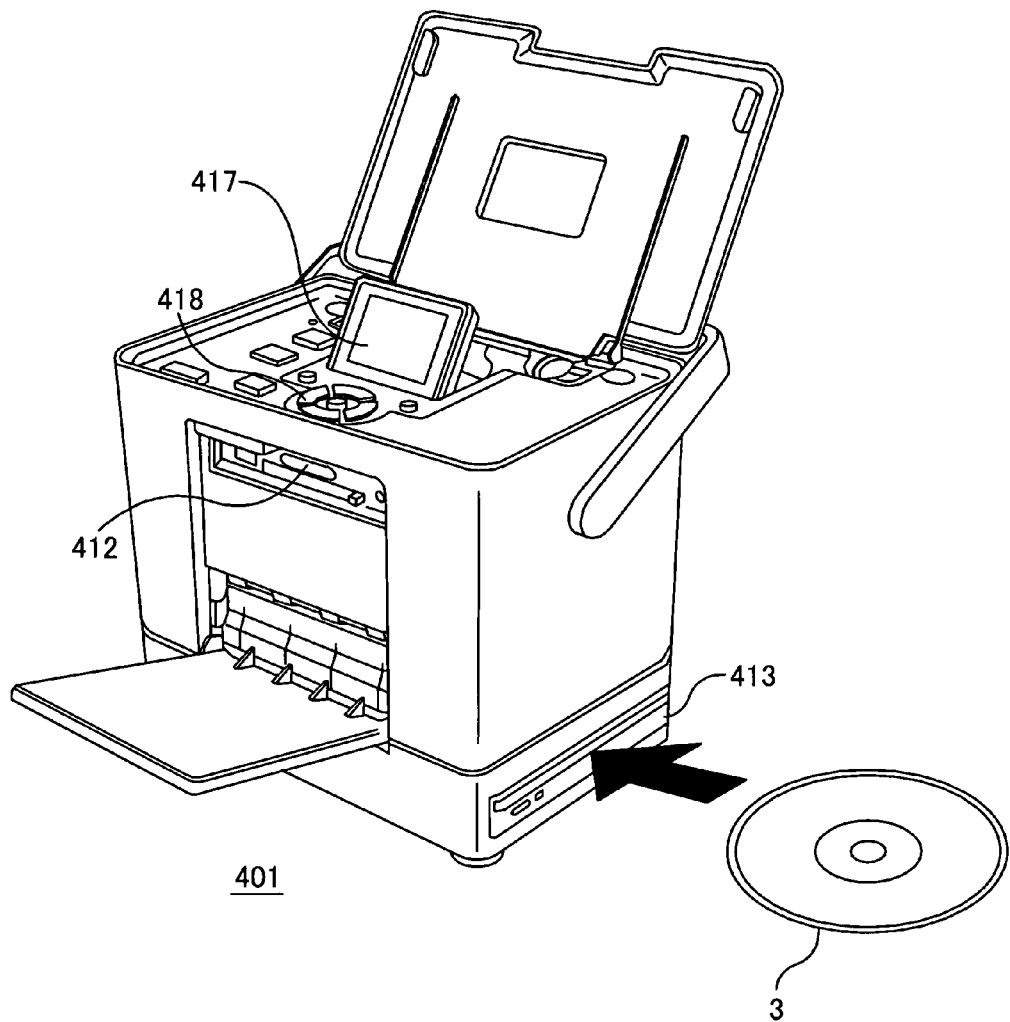
FIG. 13 is a perspective view for describing the overall configuration of a printer 401.
Figure 14:
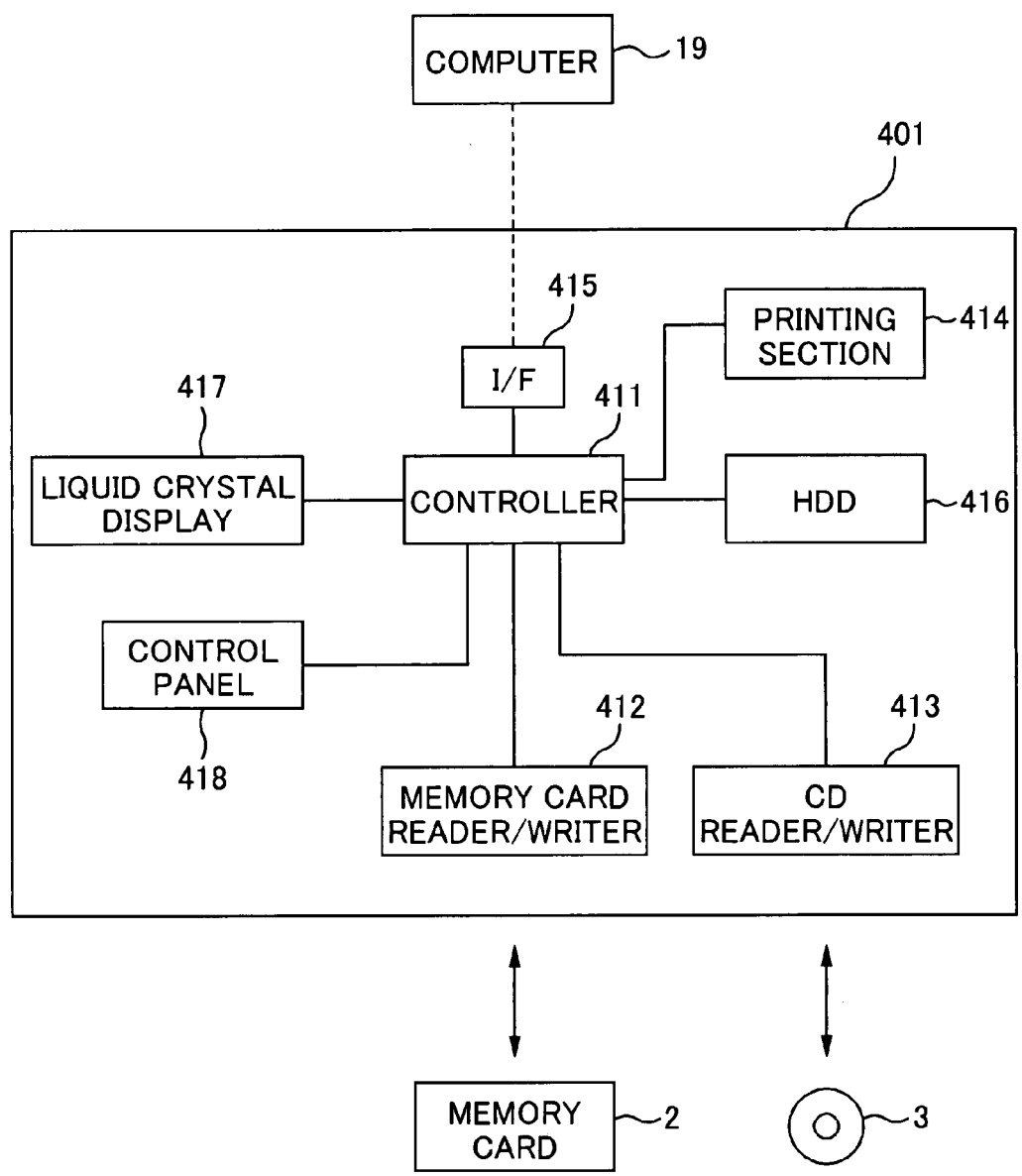
FIG. 14 is a block diagram of the overall configuration of the printer 401.

FIG. 13 is a perspective view for describing the overall configuration of a printer 401. FIG. 14 is a block diagram of the overall configuration of the printer 401. The basic configuration of the printer 401 is described below.

The printer 401 includes a controller 411, a memory card reader/writer 412, a CD reader/writer 413, a printing section 414, an interface 415, a hard disk drive 416, a liquid crystal display 417, and a control panel 418. The printer 401 can write an image data that is stored on a memory card 2 and is read by the memory card reader/writer 412, onto a CD 3 (CD-R) using the CD reader/writer 413, or onto the hard disk drive 416, and the printer 401 also can print the image data via the printing section 414.

The controller 411 controls the memory card reader/writer 412, the CD reader/writer 413, the printing section 414, the interface 415, the hard disk drive 416, the liquid crystal display 417, and the control panel 418, which are described later.

The controller 411 is furnished with a processing unit that is for processing programs and a memory that is for storing programs and data. The controller 411 runs programs stored on the memory. By running a program, the controller 411 operates a process, for example, in which backup target data stored on the memory card 2 is backed up onto the CD 3, as described later.

The memory card reader/writer 412 is structured such that a memory card can be inserted into it and that the reader/writer can read and write data from and to the memory card 2. A file system of the memory card 2 used in this example is the FAT file system. The FAT file system allocates space for storing an attribute, which is for setting each file to Read-only. The file system is structured to set an attribute to Read-only (an attribute that allows to read only and does not allow to delete directories or files) or to remove a Read-only attribute (an attribute that allows to write and to delete directories or files), on a directory-by-directory basis and a file-by-file basis.

The CD reader/writer 413 writes data onto the CD 3 and reads data stored on the CD 3. Note that, at this time, the CD 3 is structured to be able to read and write data according to the CD-ROM file system conforming to ISO 9660 level 1.

The printing section 414 forms an image on a medium according to an image data under the control of the controller 411. For example, the printing section 414 is structured to print an image on paper by ejecting ink droplets.

The interface 415 is an interface that is for connecting to a computer 19, such as a USB interface. By connecting the interface 415 to the computer, it enables the computer 19 to transmit and receive data such as an image data.

The hard disk drive 416 is structured to read and write data that is read from the memory card 2 or the CD 3. A file system of the hard disk drive 416 used in this example is the FAT file system.

The liquid crystal display 417 provides a user with visual information under the control of the controller 411. For example, the liquid crystal display 417 displays an image file stored on the memory card 2, and shows alternatives of processes to the user.

The control panel 418 is for receiving an instruction from the user. By using it, the user chooses an image file that is to be copied from the memory card 2 onto the hard disk drive 416, for example.

Figure 15:
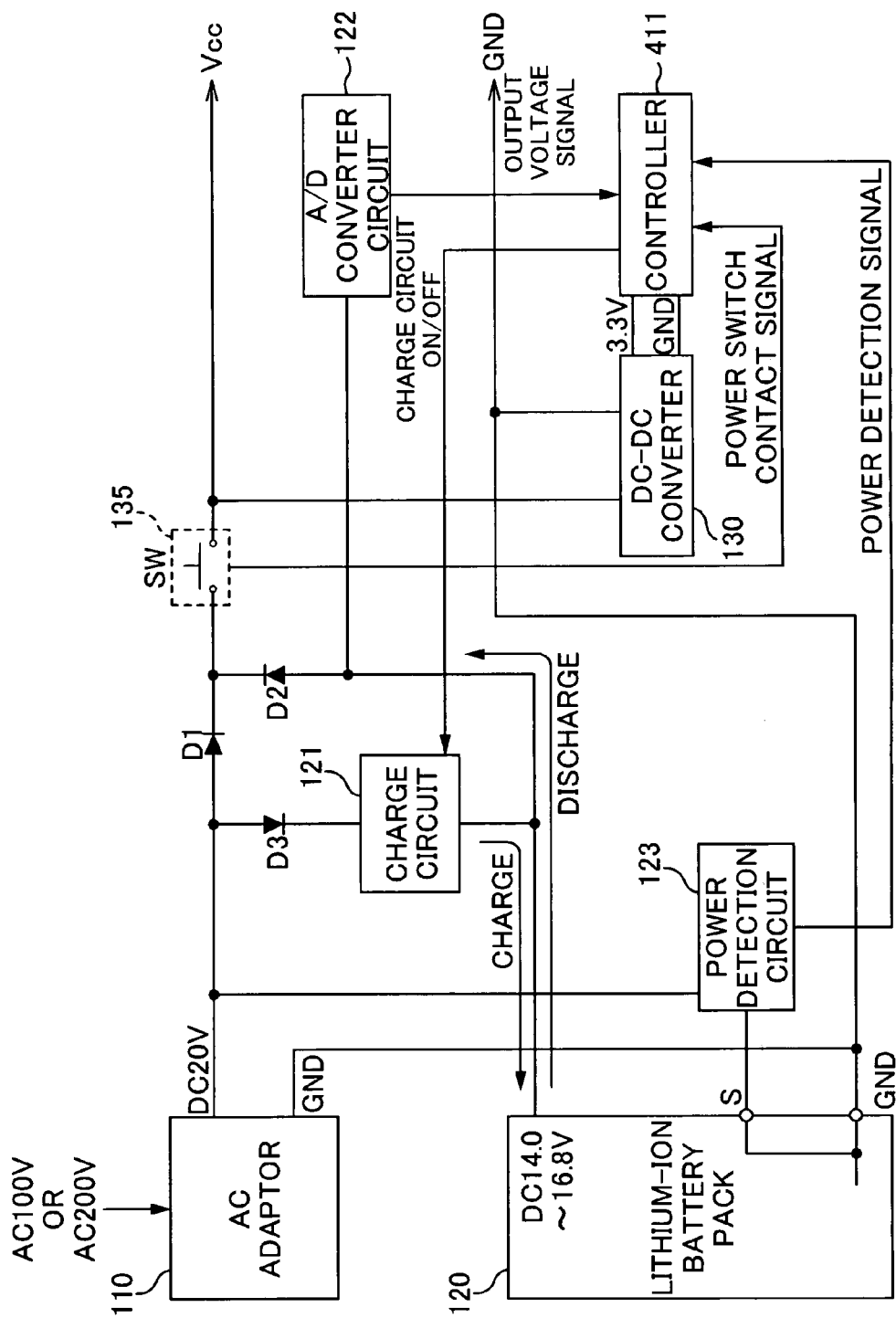
FIG. 15 is a circuit diagram showing a power system of the printer 401.

FIG. 15 is a circuit diagram showing a power system of the printer 401. The printer 401 in the present embodiment is a printer that can be battery-powered.

Electric power is supplied to a power supplying line Vcc by an external AC adaptor 110 serving as an external power supply of the printer 401 and by a lithium-ion battery pack 120 serving as a "battery" that is detachably built in the printer 401 (hereinafter referred to as a battery pack 120). The AC adaptor 110 converts AC power (e.g. AC 100V) into DC power (DC 20V). The DC power that is output by the AC adaptor 110 is supplied to the power supplying line Vcc via a diode D1. The battery pack 120 has a plurality of lithium-ion batteries built in it. The DC power that is output by the battery pack 120 is supplied to the power supplying line Vcc via a diode D2.

the power supplying line Vcc is furnished with a power switch 135, and is structured to switch electrical power of electrical devices On/Off by directly, connecting/disconnecting the power supplying line Vcc at a contact of the power switch 135.

A charge circuit 121 charges the battery pack 120 using the electric power of DC 20V that is supplied by the AC adaptor 110 via a diode D3.

An A/D converter circuit 122 can obtain information for estimating an amount of electric power of the battery pack 120. The A/D converter circuit 122 divides output voltage of the battery pack 120 at a predetermined dividing rate, and thereafter converts it into voltage in a form of digital signals and outputs it to the controller 411.

A power detection circuit 123 detects the presence or absence of electric power supply by the AC adaptor 110, and detects the presence or absence of electric power supply by the battery pack 120 by detecting whether the battery pack 120 is attached or detached. And then, the power detection circuit 123 outputs each detection result (power detection signals) to the controller 411.

The controller 411 determines whether the supplied electric power has come from the AC adaptor 110 or from the battery pack 120, based on the detecting results (the power detection signals) about the electric power supply from the AC adaptor 110 and the electric power supply from the battery pack 120 in the power detection circuit 123. Besides, the controller 411 estimates, for example, the amount of electric power of the battery pack 120 based on output signals of the A/D converter circuit 122.

Data Structure and Directory Structure

A data structure and a directory structure of the memory card 2 and the CD 3 in the second embodiment is the same as described in the first embodiment. Therefore a description thereof is omitted. The section below is described with appropriate reference to FIGS. 2 through 10 and 12 for explaining the data structure and the directory structure. A segment in which three storage areas of a lead-in, data, and a lead-out are combined as shown in FIG. 3 is referred to as a session.

Backup Process onto CD 3

Figure 16:
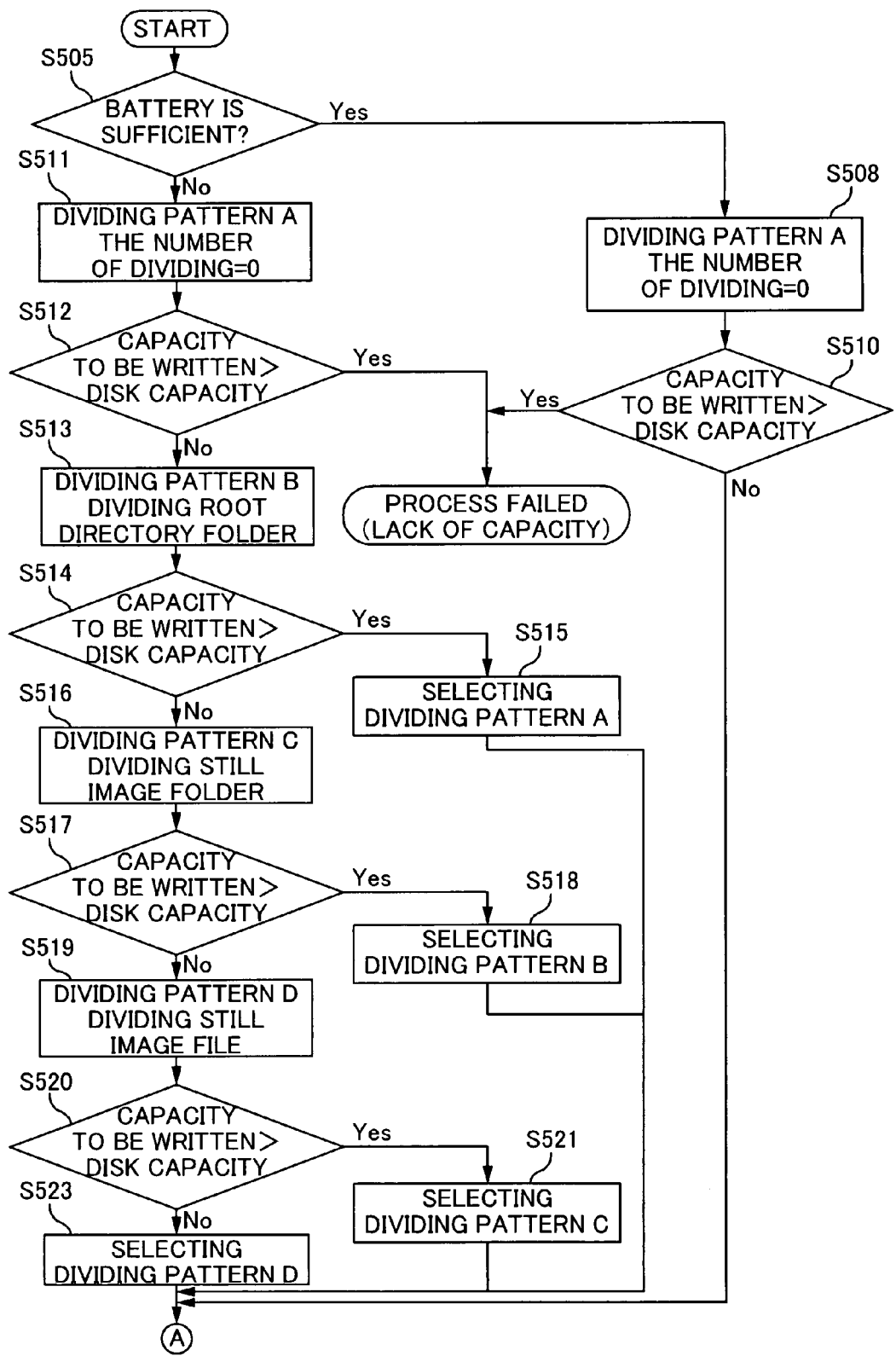
FIG. 16 is a flowchart showing procedures of a backup process in which data on the memory card 2 is backed up onto the CD 3.
Figure 17:
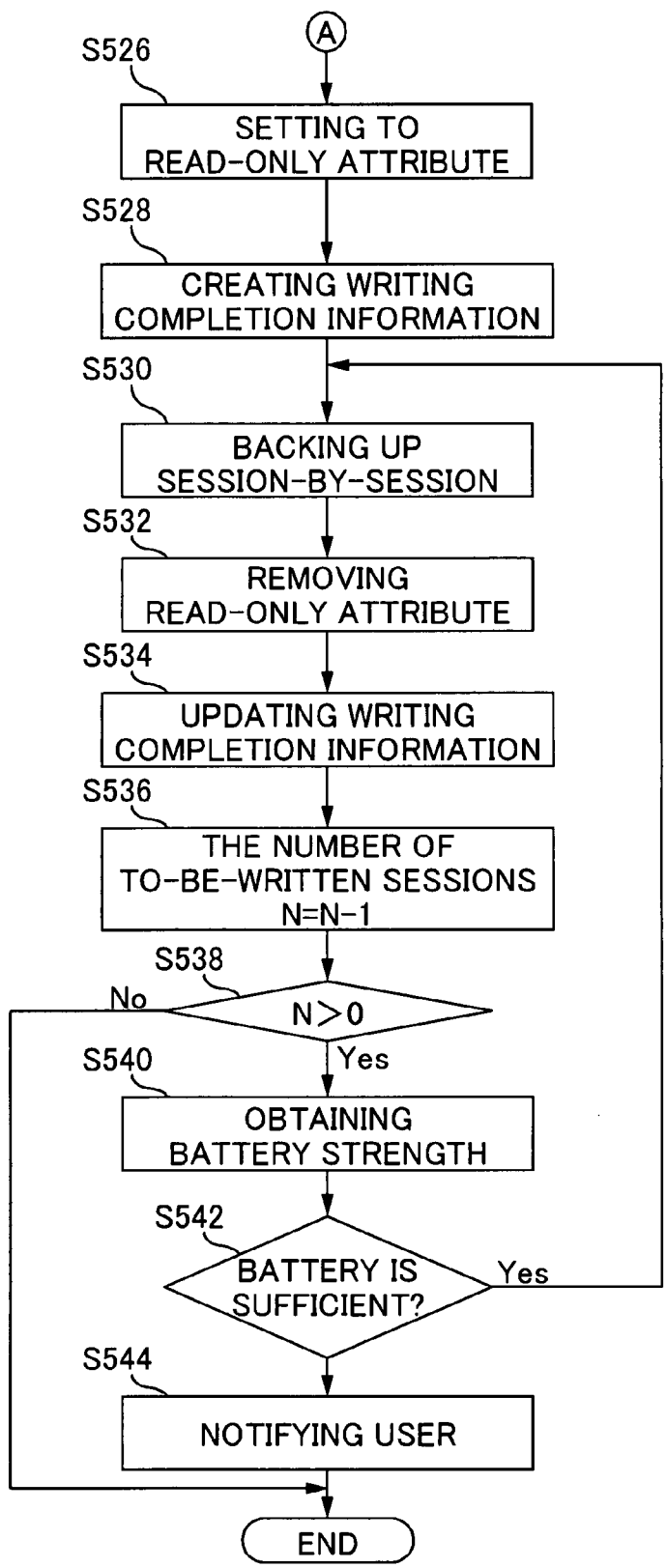
FIG. 17 is a flowchart showing procedures of a backup process in which data on the memory card 2 is backed up onto the CD 3.

FIGS. 16 and 17 are flowcharts showing procedures of a backup process in which data on the memory card 2 is backed up onto the CD 3.

First, the controller 411 decides whether or not remaining battery level of the printer 401 is sufficient to copy files on the memory card 2 onto the CD 3 (S505). In this example, the remaining battery level means remaining battery level necessary to write the data on the memory card 2 onto the CD 3 in a single session without dividing into a plurality of sessions. If a data-image file to be written is created on the hard disk drive 416 before writing backup target data onto the CD 3, the electric power necessary therefor is also taken into consideration.

If, at step S505, it is determined that remaining battery level is sufficient, it is determined that the data will be written onto the CD 3 in a single session without dividing into a plurality of sessions (S508). The reason thereof is as described below. If a session has not been successfully closed, data included in the session cannot be read from the CD 3. In processes of step S511 and thereafter, in order to reduce a risk that all data cannot be read, the data is divided into a plurality of sessions and is written. The reason thereof is that this enables to read from the CD 3 data that has been written before an uncompleted session. However, at step S505 in this example, it is determined that the battery will not run out during the writing. Therefore, in order to write all files in a single session, the number of dividing into sessions is set to zero (a dividing pattern A) in step S508.

After step S508, the controller 411 determines whether or not a total capacity of backup target data is larger than an available capacity of the CD 3 to which the data is backed up (S510). If the total capacity of the backup target data is larger than the available capacity of the CD 3 (S510: Yes), the controller 411 terminates the backup process at this stage because the process cannot succeed due to lack of the capacity of the CD. On the other hand, if the total capacity of the backup target data is not larger than the available capacity of the CD 3 (S510: No), the controller 411 subsequently performs step S526.

If, at step S505, it is determined that remaining battery level of the printer 401 is not sufficient to copy files on the memory card 2 onto the CD 3, the processes of step S511 and thereafter are performed.

Operations of steps S511 through S523 are the same as operations of steps S11 through S23 in the first embodiment. Step numbers in the second embodiment are represented by adding "5" to step numbers in the first embodiment on the third digit from the right. Accordingly, operations of steps S511 through S523 in the second embodiment will not be described because they are described in the first embodiment.

When either of steps S523 and S508 is operated as mentioned above, a session is divided according to any dividing pattern among the dividing patterns A through D.

When the dividing pattern is decided, a data-image file corresponding to each session is created on the hard disk drive 416. The data-image file is a single file into which data to be written onto the CD 3 are temporarily combined. For example, when data shown in FIG. 4A are written onto the CD 3, a single file into which these data are combined is created. By reading and writing onto the CD 3 that file, it is possible to write data continuously keeping up with CD writing speed.

When dividing according to any of the above-mentioned dividing patterns, the number of to-be-written sessions N is determined that indicates the number of remaining sessions to be written onto the CD 3.

Next, the data to be written onto the CD 3 is set to a Read-only attribute (S526). Specifically, an attribute of a file to be written onto the CD 3 is set to the Read-only attribute on the memory card 2. Besides, the data-image file that is created on the hard disk drive 416 on a session-by-session basis is set to the Read-only attribute.

Next, the controller 411 creates a file that records "writing completion information" (S528). The writing completion information includes the number of to-be-written sessions N, information of a data structure in each of the divided sessions (e.g., a data structure as shown in FIG. 4A, 4B), and information indicating whether or not each of the sessions has been written successfully onto the CD 3. The "writing completion information" is created having a predetermined file name, in either one of text file and binary file on the hard disk drive 416.

Next, a data-image file corresponding to one session among a plurality of the divided sessions is written onto the CD 3 (S530). Then, when writing corresponding to the one session has been completed onto the CD 3 and the session has been successfully closed, the controller 411 removes the Read-only attribute on the memory card 2 from files included in the session that has been written (S532). In addition, the Read-only attribute is removed from the data-image file of the session that has been written. The controller 411 deletes the data-image file of the session that has been written onto the CD 3.

Next, in order to distinguish between a session that has been successfully written onto the CD 3 and a session that has not been successfully written, of a plurality of the sessions, the writing completion information is updated (S534). Specifically, regarding a session that has been successfully written, information that the session has been successfully written is added thereto.

Next, the number of to-be-written sessions N of the writing completion information decrements (S536). The controller 11 determines whether or not the number of to-be-written sessions N is larger than zero (S538). At this stage, if the number of to-be-written sessions N is not larger than zero, that is, N=0 (S538: No), this backup process is closed because there is no more session to be written.

On the other hand, if the number of to-be-written sessions N is larger than zero (S538: Yes), the controller 11 obtains remaining battery level (S540). A memory in the controller 11 stores the remaining battery level corresponding to output voltage signals transmitted from the A/D converter circuit 122. Accordingly, the controller 11 can obtain the remaining battery level based on the output voltage signals from the A/D converter circuit. Then, the controller 11 determines whether or not remaining battery level is sufficient to write onto the CD a data-image file corresponding to a single session (S542).

If the remaining battery level is sufficient (S542: Yes), the backup process returns to step S530 in order to write onto the CD 3 a data-image file corresponding to another session. On the other hand, if the remaining battery level is not sufficient (S542: No), the controller 11 notifies the user by causing a liquid crystal display 17 to display a message that it is impossible to write the remaining sessions onto the CD 3 due to insufficient remaining battery level (S544). Then, the controller 11 closes this backup process.

The reason for determining whether or not the remaining battery level is sufficient to write a next single session, as mentioned above, is as described below. That is, if such a failure as battery power outage stops writing before a session is successfully closed, there is the possibility that additional writing onto this CD 3 becomes impossible. In this case, though there is an available capacity for an additional writing, the CD 3 in question cannot accept the additional writing and disk space is wasted. Accordingly, this example ensures that each session has been written successfully, and whether or not remaining battery level is sufficient is decided in order to prevent such a waste of disk space.

Besides, in step S544, the controller 11 notifies the user that it is impossible to write the remaining sessions onto the CD 3 due to insufficient remaining battery level. It is also possible to ask the user at this step whether or not to write the remaining sessions none the less. This is because there are cases in which the remaining sessions is successfully written if an estimate of the remaining battery level is inaccurate. In this way, it is possible to give the user flexibility in decision making for writing a session onto the CD 3.

Further, in step S538, it is also acceptable to delete the selected files in the memory card 2 when it is determined that all sessions have been written successfully. In this case, the files are "moved" safely from the memory card 2 to the CD 3.

As mentioned above, before writing onto the CD 3, an attribute of to-be-copied data is changed to Read-only on the memory card 2. On the memory card 2, the Read-only attribute of a file included in a session that has been copied successfully is removed. This enables to delete a file on the memory card 2 if a session corresponding to that file has been copied successfully, and also enables to prevent a file from being deleted if a session corresponding to that file has not been written successfully onto the CD 3. It can be seen that, in this example, the memory card 2 serves as a first storage medium and the CD 3 serves as a second storage medium.

For example, suppose that a plurality of files are divided into three sessions in order to back up the files onto the CD 3. These sessions are referred to as a first session, a second session, and a third session. Suppose that the first session has been backed up successfully, and that the battery runs out during a backup process of the second session. In such a case, the Read-only attribute of files included in the first session is removed on the memory card 2. On the other hand, an attribute of files included in the second session and the third session are set to the Read-only attribute on the memory card 2.

Under this circumstance, there is a possibility that the user forgets for some reason the fact that a backup process of only the first session has been completed though the backup was going to be processed in these three sessions. In such a case, it can be considered that the user attempts to delete all files on the memory card 2. If all files can be deleted at this stage, this causes loss of files included in the second session and the third session that have not been backed up yet. However, in this embodiment, files included in the second session and the third session that have not been backed up yet are kept set to the Read-only attribute on the memory card 2. Accordingly, even if the user mistakenly attempts to delete files, files included in the second session and the third session that have not been backed up yet are not deleted and are protected.

Furthermore, every time when writing on a session-by-session basis has been completed, the Read-only attribute on the hard disk drive 416 is removed from a data-image file corresponding to a session that has been written successfully. Besides, the "writing completion information" including information about which session has been written successfully is updated. Accordingly, a data-image file of a session from which the Read-only attribute is removed can be deleted, but a data-image file of a session that has not been written successfully will not be deleted. As a result thereof, referring again to the "writing completion information" after the printer 401 restarts enables to retry writing onto a CD the session that has not been written successfully, by using the data-image file remaining on the hard disk drive 416. It can be seen that, in this example, the hard disk drive 416 serves as the first storage medium, and the CD 3 serves as the second storage medium.

Though, in this example, data is written onto the CD 3 by using a data-image file, it is also acceptable to write a lead-in, file data, a lead-out, and the like directly onto the CD 3 without creating a data-image file. If a data-image file is not created as mentioned above, a data structure of each session in the above "writing completion information" is referred to appropriately, and writing of data is performed while creating data that is not a body of a file.

Further, even if a data-image file is not created, "writing completion information" is updated appropriately. This "writing completion information" includes information about which sessions have been written successfully, and a data structure of each session. Accordingly, even if a data-image file is not created and not all sessions have been written successfully onto the CD 3, it is possible to retry writing a session that has not been written successfully by referring to the writing completion information.

Further, even before the memory card 2 is inserted into the memory card reader/writer 412, a file on the memory card 2 has sometimes already been set to the Read-only attribute. In such a case, before processing backup, a name of the file whose attribute is Read-only is stored on the memory of the controller 411. After completion of backup, the file that has originally been set to the Read-only attribute is not deleted and remains on the memory card 2 with the Read-only attribute.

Other Embodiments

The above-mentioned embodiment is provided for facilitating the understanding of the invention and is not to be interpreted as limiting the invention. As a matter of course, the invention can be altered and improved without departing from the gist thereof and the invention includes equivalents thereof. Especially, embodiments described below are also included in the invention.

Comprehensive Description (1) The printer 401 as a backup processing device of the second embodiment, which is a more detailed embodiment, is a backup processing device for backing up a backup target file (backup target data) stored on the memory card 2 (a first storage medium) onto the CD 3 (a second storage medium).

The printer includes a dividing section and a copying section. The dividing section consists of the controller 411. The copying section includes at least the controller 411, the memory card reader/writer 412, and the CD reader/writer 413. The hard disk drive 416 is also included in the copying section as necessary.

The dividing section calculates a capacity of the CD 3 necessary to back up the backup target file in a plurality of sessions, and decides the number of dividing into the sessions based on the calculated necessary capacity and an available capacity of the CD 3.

The copying section divides the backup target file according to the number of dividing into the sessions and copies the file from the memory card 2 to the CD 3.

If it is attempted to write all files onto the CD 3 in a single session without dividing into a plurality of sessions and writing fails before successful completion, all files cannot be read. On the other hand, when the files are written onto the CD 3 in a plurality of sessions as shown in this embodiment, even if writing fails before completion, a file of a session that has been written successfully before failure can be read from the CD 3. As mentioned above, it is possible to secure data that has already been backed up.

Note that, though the CD 3 is described as the second storage medium in this example, DVD is also acceptable.

(2) The writing onto the CD 3 is controlled by a battery-powered CD-R drive. Note that such a CD-R drive can be an internal drive of the printer 401, and also can be an external drive.

Besides, the printer 401 further includes a monitoring section that monitors remaining battery level of the CD-R drive or of the printer 401 that has the CD-R drive built in it. The monitoring section includes the controller 411 and the A/D converter circuit 122.

This enables to write data onto the CD 3 while monitoring remaining battery level.

(3) If the monitoring section determines that remaining battery level is sufficient to back up the backup target file onto the CD 3, the controller 411 decides the number of dividing into the sessions to zero.

This enables to write all backup target files onto the CD 3 in a single session when remaining battery level is sufficient.

(4) If the monitoring section decides that remaining battery level is not sufficient to successfully copy a backup target file corresponding to one session, the copying section does not copy the backup target file corresponding to that session.

This enables to prevent a session from failing to be closed due to battery power outage, and to avoid cases in which additional writing cannot be performed due to the failure of the closing.

(5) After a backup target file corresponding to a certain session has been successfully copied, and before a backup target file corresponding to another session starts being copied, the above-mentioned monitoring section determines whether or not remaining battery level is sufficient to successfully copy the backup target file corresponding to the other session.

This enables to decide whether or not remaining battery level is sufficient to write one session, so that it is possible to prevent the session from failing to be closed due to battery power outage. Note that, if a session fails to be closed, there are cases in which an additional writing onto the CD cannot be performed. In this case, even though there is an available capacity for an additional writing, the CD cannot accept the additional writing and disk space is wasted. In this embodiment, the above-mentioned method enables to successfully close a session.

(6) the above-mentioned copying section has "writing completion information" about a session of a backup target file that has been successfully copied, and updates the "writing completion information" every time the backup target file has been successfully copied on a session-by-session basis.

There are cases in which not all sessions have been successfully written onto the CD 3 due to insufficient remaining battery level, etc. Even in such cases, it is possible to refer to the updated "writing completion information" and to retry writing of the sessions according to this information.

(7) Before a backup target file is copied onto the CD 3, the above-mentioned copying section changes an attribute of the backup target file stored on the memory card 2 to Read-only. Besides, after the backup target file has been successfully copied onto the CD 3, the copying section changes the attribute of the backup target file stored on the memory card 2 to an attribute that is deletable on a session-by-session basis.

This enables to prevent data that has not been successfully copied onto the CD 3 from being deleted mistakenly from the memory card 2.

(8) As a matter of course, there is also the following method for processing backup. That is to say, this method for processing backup includes a step of calculating a capacity of the CD 3 necessary to back up a backup target file stored on the memory card 2 in a plurality of sessions. Besides, the method for processing backup includes a step of deciding the number of dividing into the sessions based on the calculated necessary capacity and an available capacity of the CD 3. Further, this method for processing backup includes a step of copying the backup target file from the memory card 2 to the CD 3, by dividing according to the decided number of dividing into the sessions.

When the files are written onto the CD 3 in a plurality of sessions as shown in this embodiment, even if writing fails before completion, a file of a session that has been written successfully before failure can be read from the CD 3. As mentioned above, it is possible to secure data that has already been backed up.

(9) As a matter of course, there is a program for causing a backup processing device to perform the above-mentioned method for processing backup.

What is claimed is:

1. A method for processing backup, comprising:
   calculating a first necessary capacity of a second storage medium when backing up, in a first number of divided sessions, backup target data stored on a first storage medium;
   calculating a second necessary capacity of the second storage medium when backing up, in a second number of divided sessions, the backup target data stored on the first storage medium, the second number being larger than the first number;
   in case that the second necessary capacity is larger than an available capacity of the second storage medium, copying the backup target data from the first storage medium to the second storage medium according to the first number of divided sessions; and
   in case that the second necessary capacity is not larger than the available capacity of the second storage medium, copying the backup target data from the first storage medium to the second storage medium according to the second number of divided sessions.

2. A method for processing backup according to claim 1, wherein:
   the second storage medium is controlled by a battery-powered apparatus; and
   remaining battery level of the battery-powered apparatus is monitored.

3. A method for processing backup according to claim 2, wherein:
   when it is determined that the remaining battery level is sufficient to back up the backup target data onto the second storage medium, the first number of divided sessions is zero.

4. A method for processing backup according to claim 2, wherein:
   when it is determined that the remaining battery level is not sufficient to successfully copy backup target data corresponding to one session, the backup target data corresponding to the one session is not copied.

5. A method for processing backup according to claim 4, wherein:
   after backup target data corresponding to a certain session has been successfully copied, before copying of backup target data corresponding to another session is started, whether or not the remaining battery level is sufficient to successfully copy the backup target data corresponding to the other session is determined.

6. A method for processing backup according to claim 1, wherein:
   information relating to a session of the backup target data that has been successfully copied is stored, and the information is updated every time the backup target data has been successfully copied on a session-by-session basis.

7. A method for processing backup according to claim 1, wherein:
   before the backup target data is copied to the second storage medium, an attribute of the backup target data stored on the first storage medium is changed to Read-only; and
   after the backup target data has been successfully copied to the second storage medium, the attribute of the backup target data stored on the first storage medium is changed to an attribute that is deletable on a session-by-session basis.

8. A method for processing backup according to claim 1, wherein:
   the first number of divided sessions is decided using a sub-directory on a first level, which is located on a root directory, as a unit of dividing.

9. A method for processing backup according to claim 8, wherein:
   the second number of divided sessions is decided using a sub-directory on or below a second level, which is below the sub-directory on the first level, as a unit of dividing.

10. A method for processing backup according to claim 8, wherein:
    when a plurality of files is included in a same directory, the first number of divided sessions is decided according to a creation date of each of the files.

11. A method for processing backup according to claim 8, wherein:

when a plurality of image files taken by a digital camera are included in a same directory, the second number of divided sessions is decided according to accompanying information that relates to a picture-taking condition, which is included in each of the image files.

12. A method for processing backup according to claim 1, wherein:
the second storage medium is according to a CD-ROM file system.

13. A backup processing device for backing up backup target data stored on a first storage medium onto a second storage medium, comprising:
a first storage medium;
a dividing section that calculates a first necessary capacity of the second storage medium when backing up the backup target data in a first number of divided sessions, and that calculates a second necessary capacity of the second storage medium when backing up, in a second number of divided sessions, the backup target data stored on the first storage medium, the second number being larger than the first number; and
a copying section that in case that the second necessary capacity is larger than an available capacity of the second storage medium, copying the backup target data from the first storage medium to the second storage medium according to the first number of divided sessions, and that in case that the second necessary capacity is not larger than the available capacity of the second storage medium, copying the backup target data from the first storage medium to the second storage medium according to the second number of divided sessions.

14. A storage medium storing a program for operating a backup processing device, the program comprising:
a code for calculating a first necessary capacity of a second storage medium when backing up, in a first number of divided sessions, backup target data stored on a first storage medium;
a code for calculating a second necessary capacity of a second storage medium when backing up, in a second number of divided sessions, the backup target data stored on the first storage medium, the second number being larger than the first number; and
a code for in case that the second necessary capacity is larger than an available capacity of the second storage medium, copying the backup target data from the first storage medium to the second storage medium according to the first number of divided sessions, and for in case that the second necessary capacity is not larger than the available capacity of the second storage medium, copying the backup target data from the first storage medium to the second storage medium according to the second number of divided sessions.

* * * * *